United States Patent [19]

Lech, Jr. et al.

[11] Patent Number: 4,620,626

[45] Date of Patent: Nov. 4, 1986

[54] CLUTCH DRIVEN PLATE ASSEMBLY WITH AN ANTI-RATTLE DAMPER

[75] Inventors: Thaddeus Lech, Jr., Sterling Heights; Bruce A. Mullard, Mt. Clemens, both of Mich.

[73] Assignee: Borg-Warner Automotive, Inc., Troy, Mich.

[21] Appl. No.: 754,037

[22] Filed: Jul. 11, 1985

[51] Int. Cl.$^4$ .................... F16D 3/12; F16D 13/38
[52] U.S. Cl. ...................... 192/106.2; 192/106.1; 464/64; 464/68
[58] Field of Search ............... 192/70.17, 106.1, 106.2; 464/161, 64, 66, 67, 68; 74/440

[56] References Cited

U.S. PATENT DOCUMENTS

| | | | |
|---|---|---|---|
| 1,807,798 | 6/1931 | Short | 74/574 |
| 1,967,052 | 7/1934 | Dumm | 192/106.1 X |
| 2,745,268 | 5/1956 | Reed | 64/27 |
| 2,853,862 | 9/1958 | Thelander | 64/27 |
| 3,252,300 | 5/1966 | Hofmann | 64/27 |
| 4,043,437 | 8/1977 | Taylor | 192/13 R |
| 4,046,237 | 9/1977 | Root et al. | 192/13 R |
| 4,068,749 | 1/1978 | Antrim | 192/106.1 |
| 4,222,475 | 9/1980 | Fenart | 192/106.2 |
| 4,241,818 | 12/1980 | Miller | 192/55 |
| 4,418,812 | 12/1983 | Lech, Jr. | 192/70.17 X |
| 4,446,955 | 5/1984 | Lech, Jr. | 192/106.1 X |
| 4,553,655 | 11/1985 | Lech, Jr. et al. | 192/106.1 X |

OTHER PUBLICATIONS

U.S. patent application Ser. No. 556,518 filed Nov. 30, 1983-Thaddeus Lech, Jr.

Primary Examiner—Rodney H. Bonck
Assistant Examiner—Alan G. Towner
Attorney, Agent, or Firm—James A. Geppert

[57] ABSTRACT

A clutch driven plate assembly for use in an automotive vehicle adapted to dissipate the irregular impulses of the vehicle internal combustion or diesel engine with the transmission in neutral, the clutch engaged and the engine at idle rpm. The assembly includes a clutch plate, a spring retainer plate secured to the clutch plate, and a hub assembly including an inner hub in operative engagement with the transmission input shaft and an outer hub having an integral hub flange with damper spring windows axially aligned with spring windows in the clutch and spring retainer plates, and a backlashing splined connection between said hubs to allow limited relative rotation thereof. A cam retainer is mounted on the inner hub to rotate therewith and has a plurality of spaced camming recesses facing the outer hub; the outer hub having axial passages receiving compression springs and plungers biased by the springs into engagement with the complementary recesses formed in the cam retainer. Rotation of the clutch and spring retainer plates, damper springs and outer hub relative to the inner hub causes the plungers to be cammed out of the recesses against the force of the compression springs.

10 Claims, 8 Drawing Figures

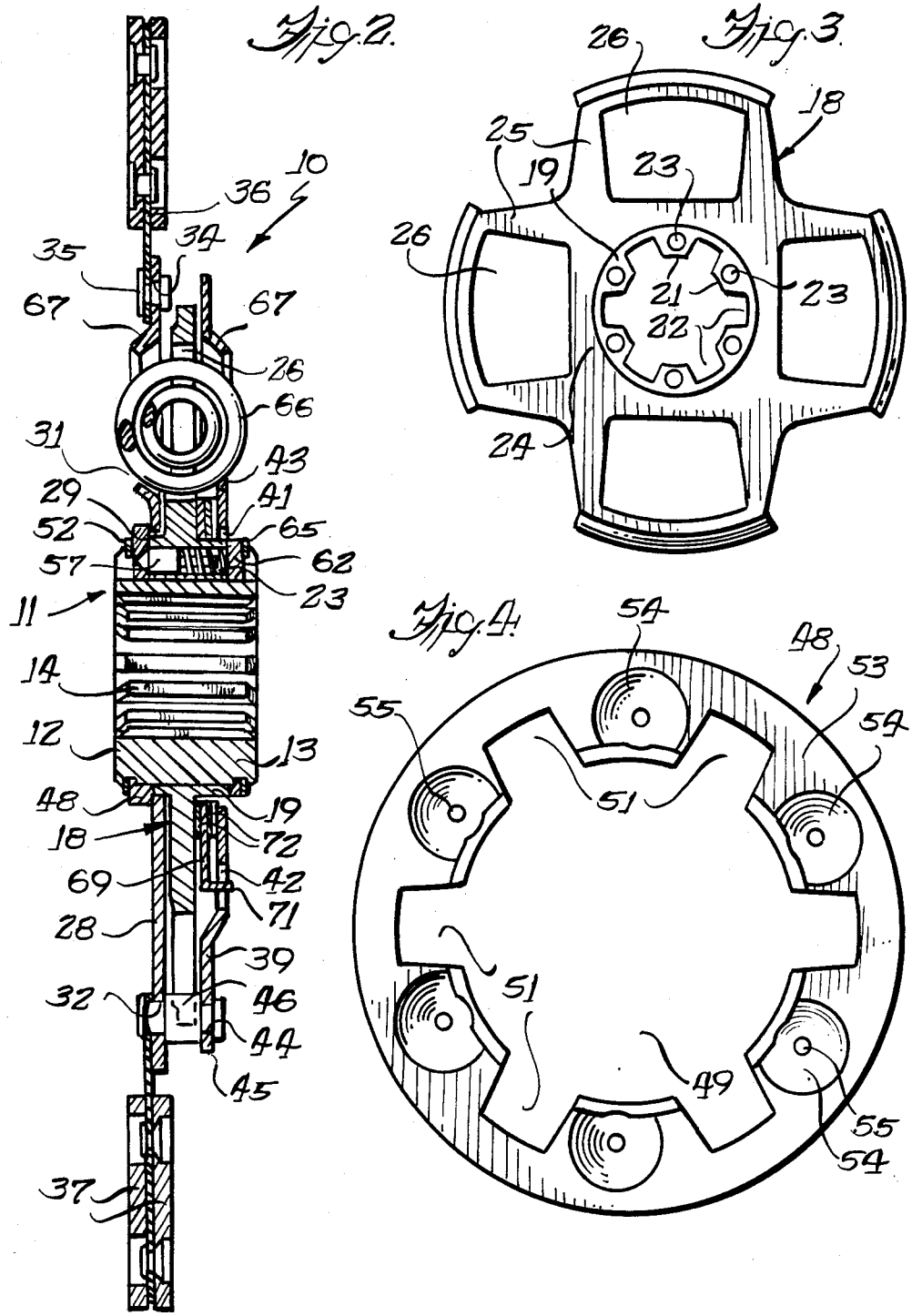

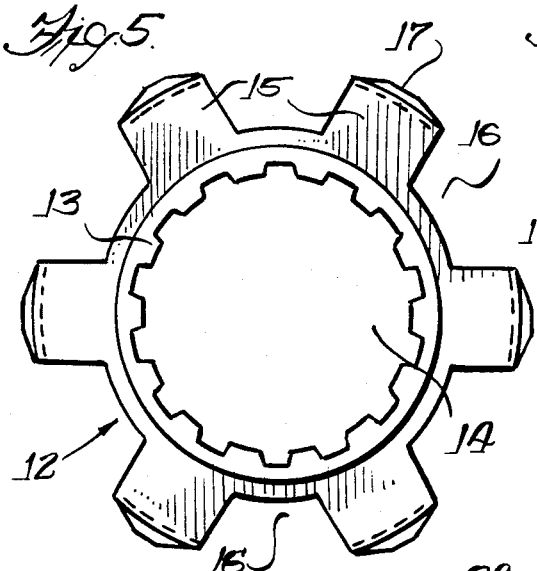
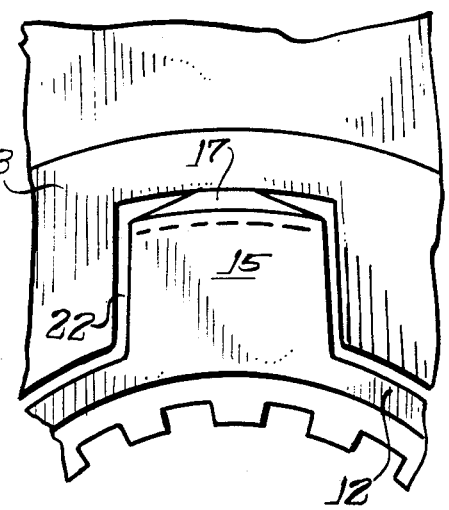
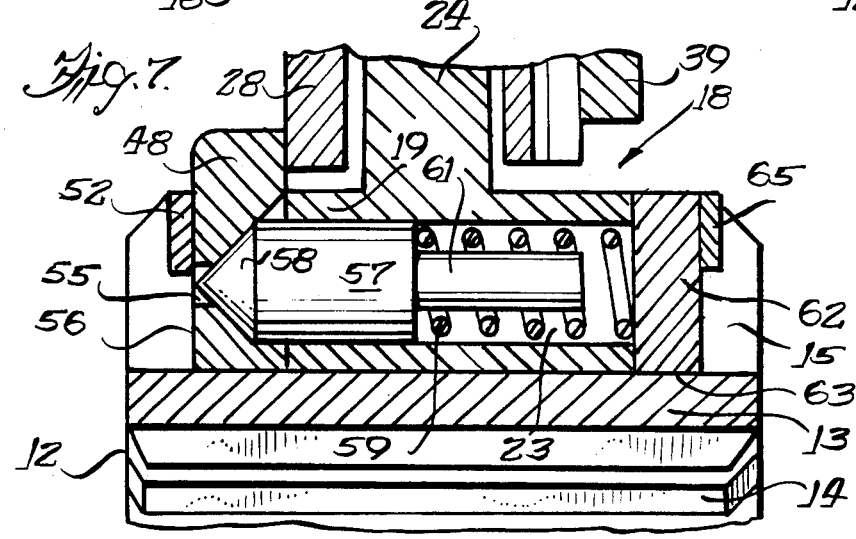
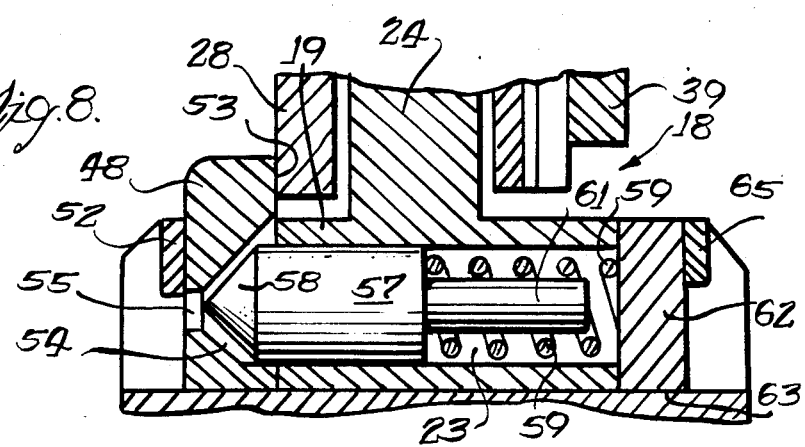

CLUTCH DRIVEN PLATE ASSEMBLY WITH AN ANTI-RATTLE DAMPER

BACKGROUND OF THE INVENTION

In a conventional friction clutch for an automotive vehicle having a manual transmission, power and inertia impulses are produced by the vehicle engine which drive the engaged clutch with an irregular series of thrusts with the transmission in neutral and the engine at idle rpm. These impulses will be transmitted through the clutch and transmission input shaft to the transmission gears which become excited, resulting in oscillation through their backlash space to produce objectionable rattle. In U.S. Pat. No. 4,446,955, a driven plate assembly is disclosed utilizing a helical connection between an inner hub and an outer hub to translate rotary to linear motion and allow relative axial movement between the hubs to dissipate the engine impulses. In the copending U.S. application Ser. No. 556,518, axially oriented spring-loaded detents between the hub and a retainer are shown for the same purpose. The present invention relates to another approach to this problem to simplify construction of the clutch assembly.

SUMMARY OF THE INVENTION

The present invention comprehends the provision of a clutch driven plate assembly having a novel low spring rate damping means between the outer hub of a hub assembly and a retainer rotatable with the inner hub to dissipate engine impulses which previously resulted in objectionable transmission backlash gear rattle with the clutch engaged, the transmission in neutral and the engine at idle rpm. The hub assembly includes an inner hub having a barrel in operative engagement with the transmission input shaft, a plate-like outer hub containing damping spring windows, and a backlashing spline engagement between the inner and outer hubs. The anti-rattle damping means comprises spring-loaded plungers located in passages in the outer hub and camming recesses located on the retainer secured onto the inner hub to rotate therewith. The clutch plate carrying the clutch friction facings at its periphery and the spring retainer plate are secured together to sandwich the outer hub therebetween and contain damper spring windows axially aligned with and substantially of the same dimensions as the outer hub spring windows to receive damper springs to rotate together without relative movement therebetween during the initial anti-rattle damping rotation.

The present invention also comprehends the provision of a clutch driven plate assembly having a novel low-friction anti-rattle damping means including a pair of retainers secured at the opposite ends of the inner hub and sandwiching the outer hub; one retainer having a plurality of camming recesses facing the outer hub. The outer hub includes a barrel having a plurality of axial passages therein receiving spring-loaded plungers having camming ends conformably received in and biased into engagement with the camming recesses in the retainer; the opposite retainer being secured onto the inner hub to rotate therewith.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is an enlarged cross sectional view of the assembly taken on the irregular line 2—2 of FIG. 1.

FIG. 3 is a rear elevational view of the outer hub.

FIG. 4 is an enlarged rear elevational view of the camming retainer.

FIG. 5 is an enlarged rear elevational view of the inner hub.

FIG. 6 is an enlarged partial rear elevational view of the inner and outer hubs showing the backlashing spline connection between them.

FIG. 7 is an enlarged partial cross sectional view of the plunger and camming recess in its normal position.

FIG. 8 is an enlarged partial cross sectional view similar to FIG. 7 showing the plunger and camming recess in a position with torque applied.

DESCRIPTION OF THE PREFERRED EMBODIMENT

Figure 1:
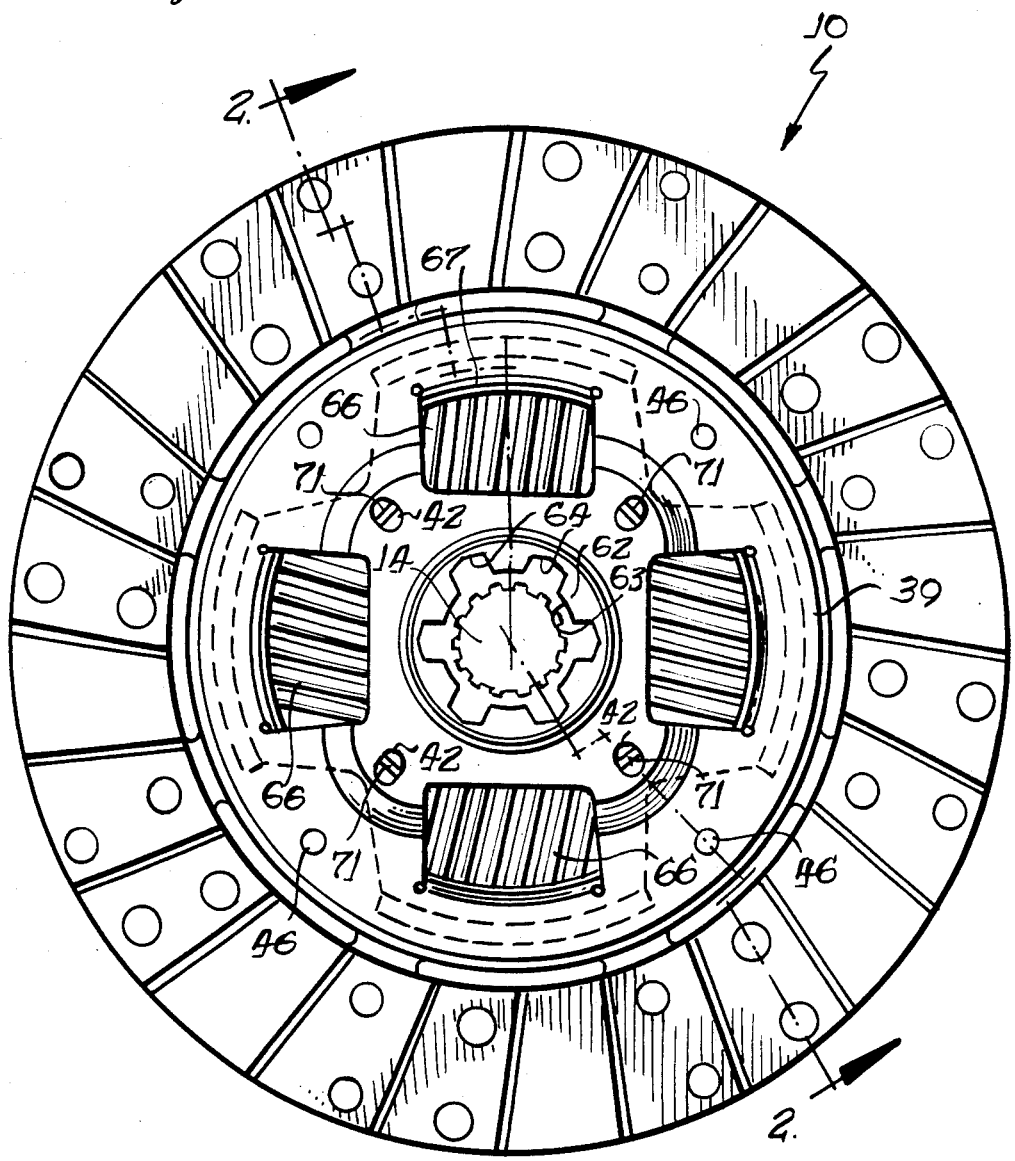
FIG. 1 is a rear elevational view of a clutch driven plate assembly embodying the present invention.

Referring more particularly to the disclosure in the drawings wherein is shown an illustrative embodiment of the present invention, FIGS. 1 and 2 disclose a clutch driven plate assembly 10 including a hub assembly 11, a clutch plate 28 carrying friction facings 37 mounted on the periphery thereof and adapted to be positioned between friction surfaces of a flywheel and a pressure plate (not shown) for the vehicle clutch, and a spring retainer plate 39. The hub assembly 11 includes an inner hub 12 in the form of a barrel 13 having a splined central opening 14 receiving the splined end of a transmission input shaft (not shown) and a plurality of circumferentially equally spaced external backlash splines 15 separated by axial grooves 16. Each spline is provided with a tapered outer edge 17 to decrease frictional contact with an outer hub 18.

The outer hub 18 includes a central barrel 19 having a plurality of backlashing splines 21 separated by axial grooves 22; the grooves 22 having a greater width than the inner hub splines 15 received therein (see FIG. 6) to allow limited relative rotation between the hubs. An axial passage 23 extends through each spline 21 for a purpose to be later described, and a radial flange 24 integral with the barrel 19 terminates in four circumferentially spaced radial arms 25; each arm having a spring window 26 therein.

The clutch driven plate 28 has a central opening 29 journalled on the outer hub 18, a plurality of circumferentially equally spaced spring windows 31, a plurality of openings 32 arranged in an inner circle, and a plurality of openings 34 adjacent the periphery of the plate. The openings 34 receive rivets 35 to secure cushioning plates 36 carrying the opposed friction facings 37 for the clutch secured thereto.

The spring retainer plate 39 (FIGS. 1 and 2) has a central opening 41, a pluralilty of inner openings 42, a plurality of circumferentially equally spaced arcuate spring windows 43 axially aligned with the windows 26 and 31 of the outer hub arms 25 and clutch plate 28, respectively, and a plurality of openings 44 in its periphery 45 axially aligned with openings 32 to receive spacer rivets 46 securing the clutch plate 28 and spring retainer plate 39 together; the rivets extending through the spaces between the outer hub arms 25.

A generally circular cam retainer 48 has a central opening 49 receiving the inner hub barrel 13 with axial grooves 51 conformably receiving the splines 15 on the inner hub 12; the periphery of the inner hub having an annular groove receiving a snap ring 52 to mount the retainer on the hub. Formed in the rear face 53 of the retainer between the grooves 51 are a plurality of substantially conical camming recesses 54, each terminating in a reduced diameter passage 55 opening into the front retainer face 56 (see FIG. 7). Received in each recess 54 is the conical end 58 of a cylindrical plunger 57 biased by a compression spring 59 in each passage 23 of the outer hub; each plunger being shouldered to provide a reduced diameter stem 61 received within the coils of the compression spring 59. As seen in FIGS. 2, 7 and 8, a second retainer 62 is located on the inner hub at the opposite end of the outer hub barrel; the retainer having a central opening 63 with grooves 64 (see FIG. 1) conformably receiving the splines 15 to rotate therewith. A second snap ring 65 in an annular groove formed in the inner hub secures the retainer; the retainers 48 and 62 sandwiching the outer hub barrel 19 to prevent axial movement thereof.

One or more concentric damper springs 66 are located in each aligned set of spring windows 31,43 and 26 in the plates and outer hub flange, respectively, with the plate windows 31 and 43 having inclined lips 67 to retain the springs in operative position. A thrust plate 69 located between the outer hub flange and spring retainer plate includes a substantially flat annular body with a pluralilty of rearwardly extending peripheral tabs 71 bent 90° to the body and projecting into the openings 42 of the spring retainer plate 38 so that the plates rotate together. Shims 72 are positioned between the outer hub flange, thrust plate and spring retainer plate to provide friction lag where desired.

In the normal position of the hub assembly in the absence of applied torque with the clutch engaged, as seen in FIGS. 2 and 7, the plungers 57 are resiliently biased into engagement in the complementary recesses 54 in the forward retainer 48. This clutch assembly operates in the same manner as a conventional damper assembly except for the action of the plungers coacting with the retainer at idle rpm and in neutral transmission position. With the clutch plate engaged between the flywheel and pressure plate, the engine impulses during idle act to rotate the clutch plate 28, spring retainer plate 39, damper springs 66 and outer hub 18 relative to the inner hub 12 due to the spacing between the backlashing splines 15 and grooves 22 of the inner and outer hubs, respectively. As the cam retainer 48 remains stationary with the inner hub 12 and the plungers 57 move with the outer hub, the impulses urge the plungers to climb out of the recesses 54 in the retainer 48 against the force of and compressing the springs 59 (see FIG. 8) to produce resilient cushioning and prevent gear rattle. Movement continues until the walls of the splines and grooves engage each other. The energy of the impulses is thus used to actuate the plungers and produce a low rate spring force in the above manner rather than transmit the undiminished impulses to the vehicle transmission to cause its gears to rattle. The low rate spring force is produced in an axial direction to reduce harmonic influence and resonance by changing the plane of motion.

In the normal driving mode of the vehicle, the clutch and spring retainer plates rotate to compress the damper springs 66 upon torque application to the friction facings, which will dampen the vibrations of the drive train in a conventional manner.

We claim:

1. A clutch driven plate assembly for an automotive vehicle clutch driving a transmission input shaft, comprising a hub assembly having an inner hub with a barrel splined onto the input shaft and external backlashing splines, and an outer hub having a barrel with internal backlashing splines and an integral radial flange, a clutch plate carrying friction facings at the outer periphery thereof, a spring retainer plate secured to the clutch plate to sandwich said outer hub flange therebetween, said plates and outer hub flange having axially aligned coinciding sets of circumferentially spaced windows therein, and damper springs received in each set of windows, the improvement comprising a cam retainer received on said inner hub to rotate therewith and having a plurality of camming recesses facing said outer hub, and a plurality of plungers yieldably biased in said outer hub barrel such that rotation of said plates, damper springs and outer hub relative to said inner hub and retainer causes said plungers to cam out of said cam retainer recesses.

2. A clutch driven plate assembly as set forth in claim 1, wherein said outer hub barrel has a plurality of axial passages extending therethrough and axially aligned with said camming recesses, each passage housing a plunger and a compression spring.

3. A clutch driven plate assembly as set forth in claim 2, in which each said passage extends through a spline formed in the outer hub barrel.

4. A clutch driven plate assembly as set forth in claim 1, wherein said retainer has axial grooves conformably receiving said splines on said inner hub, and a snap ring on said inner hub holding said retainer adjacent the outer hub barrel.

5. A clutch driven plate assembly as set forth in claim 4, including a second retainer positioned on the opposite end of said inner hub, said retainers sandwiching said outer hub barrel therebetween.

6. A clutch driven plate assembly as set forth in claim 5, wherein a snap ring is located on each end of said inner hub to secure said retainers thereon.

7. A clutch driven plate assembly as set forth in claim 2, wherein said camming recess is generally conical and said plunger has a complementary conical free end received in said recess.

8. A clutch driven plate assembly as set forth in claim 7, wherein each said plunger includes a reduced diameter stem received in the coils of said compression spring.

9. A clutch driven plate assembly as set forth in claim 8, including a second retainer secured at the opposite end of said inner hub, and said compression springs engage said second retainer.

10. A clutch driven plate assembly as set forth in claim 1, wherein said backlashing spline connection between said inner and outer hubs allows relative rotation therebetween.

* * * * *